(12) United States Patent
Kornylo et al.

(10) Patent No.: US 6,942,240 B2
(45) Date of Patent: Sep. 13, 2005

(54) STRUCTURAL REINFORCEMENT MEMBER FOR AN INFLATABLE RESTRAINT MODULE

(75) Inventors: Walter P. Kornylo, Livonia, MI (US); Karthik V. Kumar, Farmington Hills, MI (US); Eric R. Langley, Howell, MI (US)

(73) Assignee: Intier Automotive Inc., Newmarket (CA)

( * ) Notice: Subject to any disclaimer, the term of this patent is extended or adjusted under 35 U.S.C. 154(b) by 153 days.

(21) Appl. No.: 10/345,018

(22) Filed: Jan. 15, 2003

(65) Prior Publication Data

US 2004/0135350 A1 Jul. 15, 2004

(51) Int. Cl.[7] ............................................. B60R 21/16
(52) U.S. Cl. ..................................... 280/728.2; 280/732
(58) Field of Search ........................... 280/728.2, 728.3, 280/732, 731

(56) References Cited

U.S. PATENT DOCUMENTS

| | | | |
|---|---|---|---|
| 5,127,669 A | 7/1992 | Suran et al. | |
| 5,135,252 A | 8/1992 | Suran et al. | |
| 5,145,207 A | 9/1992 | Bederka et al. | |
| 5,242,192 A | 9/1993 | Prescaro et al. | |
| 5,275,432 A | 1/1994 | Pray et al. | |
| 5,333,901 A | 8/1994 | Barnes | |
| 5,378,012 A | 1/1995 | Seiki et al. | |
| 5,419,583 A | * 5/1995 | Sakakida et al. | ......... 280/728.2 |
| 5,437,469 A | * 8/1995 | Monden | ................... 280/728.3 |
| 5,529,332 A | 6/1996 | Wipasuramonton | |
| 5,540,460 A | 7/1996 | Wipasuramonton | |
| 5,560,646 A | * 10/1996 | Gray et al. | ............... 280/728.3 |
| 5,566,977 A | 10/1996 | Wipasuramonton | |
| 5,755,460 A | 5/1998 | Barnes et al. | |
| 5,803,487 A | 9/1998 | Kikuchi et al. | |
| RE36,167 E | 3/1999 | Barnes | |
| 5,890,734 A | * 4/1999 | Saderholm | ............... 280/730.2 |
| 6,012,735 A | 1/2000 | Gray et al. | |
| 6,045,153 A | * 4/2000 | Sommer et al. | ......... 280/728.3 |
| 6,076,849 A | * 6/2000 | Holzapfel et al. | ....... 280/728.2 |
| 6,299,198 B1 | * 10/2001 | Nakashima et al. | ...... 280/728.3 |
| 6,623,029 B2 | * 9/2003 | Sun et al. | ................. 280/728.2 |

* cited by examiner

Primary Examiner—David R. Dunn
(74) Attorney, Agent, or Firm—Honigman Miller Schwartz and Cohn LLP

(57) ABSTRACT

An inflatable restraint module comprises an inflatable restraint canister including an inflatable restraint, an instrument panel including an inflatable restraint door, and a structural reinforcement member that maintains proper deployment of the inflatable restraint. The structural reinforcement member is attached to an inflatable restraint chute that extends from the instrument panel at a first location and is attached to the structural member and the instrument panel at a second location. Upon deployment of an inflatable restraint, the structural reinforcement member goes into tension, thereby causing the structural reinforcement member to relieve stresses imparted to the instrument panel. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

18 Claims, 4 Drawing Sheets

STRUCTURAL REINFORCEMENT MEMBER FOR AN INFLATABLE RESTRAINT MODULE

TECHNICAL FIELD

The present invention relates to an inflatable restraint module, and in particular to a structural reinforcement for an inflatable restraint module.

BACKGROUND OF THE INVENTION

Typically, an inflatable restraint deploys rearwardly in a vehicle toward a passenger or occupant of the vehicle. The inflatable restraint, such as an airbag, may be located behind an instrument panel area, such as a dashboard. An inflatable restraint module may include an inflatable restraint canister that includes the inflatable restraint and an inflatable restraint chute. The dashboard may include an inflatable restraint door that is formed in the dashboard. Proper deployment of the inflatable restraint is necessary for the safety of the occupants of the vehicle. However, the inflatable restraint module and/or instrument panel may undergo mechanical failure or misalignment, such as a displacement of the dashboard, during the deployment of the inflatable restraint, thereby resulting in improper deployment of the inflatable restraint.

Thus, a need exists for an improved inflatable restraint module that minimizes mechanical failure of the inflatable restraint module and/or instrument panel and maintains proper alignment of the inflatable restraint during deployment of the inflatable restraint.

SUMMARY OF THE INVENTION

The inventors of the present invention have recognized these and other problems associated with conventional inflatable restraint modules. To this end, the inventors have developed a structural reinforcement member for an inflatable restraint module comprising a first attachment portion, an intermediate portion that extends from the first attachment portion, and a second attachment portion that extends from the intermediate portion. The first attachment portion of the structural reinforcement member is attached to an inflatable restraint chute that extends from an instrument panel. The second attachment portion of the structural reinforcement member is attached to a structural member and the instrument panel on an inboard surface of the instrument panel. Upon deployment of an inflatable restraint, the structural reinforcement member goes into tension, thereby causing the structural reinforcement member to relieve stresses imparted to the instrument panel.

In another aspect of the invention, an inflatable restraint module comprises an inflatable restraint canister including an inflatable restraint, an instrument panel including an inflatable restraint door, and a structural reinforcement member attached at a first location to an inflatable restraint chute extending from the instrument panel and attached at a second location to the instrument panel. Upon deployment of the inflatable restraint, the structural reinforcement member goes into tension, thereby causing the structural reinforcement member to relieve stresses imparted to the instrument panel.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
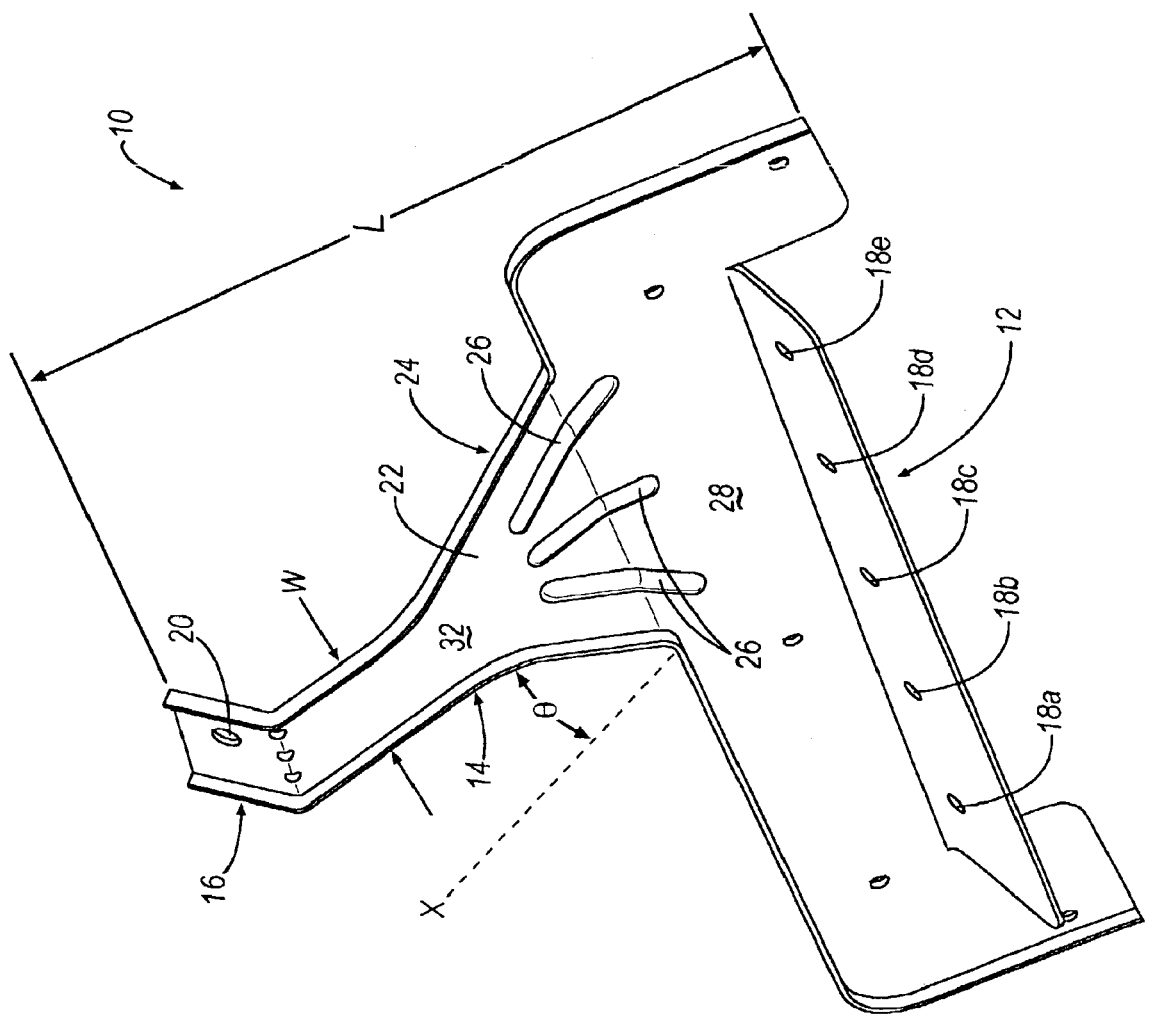
FIG. 1 is a perspective view of a structural reinforcement member for an inflatable restraint module according to an embodiment of the invention.
Figure 2:
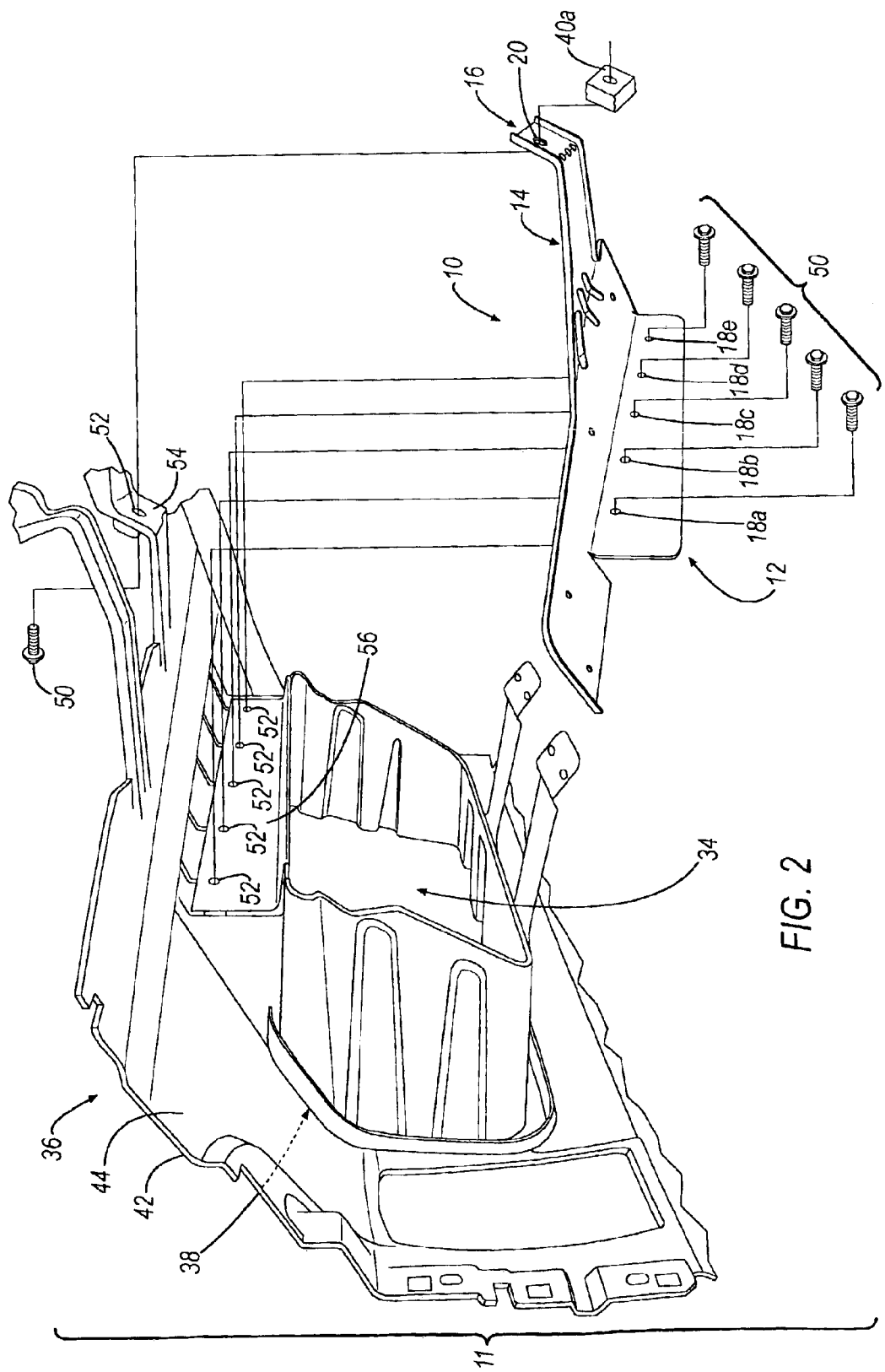
FIG. 2 is a rear, inboard, cutaway perspective view of the inflatable restraint module when the structural reinforcement member is not attached to the inflatable restraint module.
Figure 3:
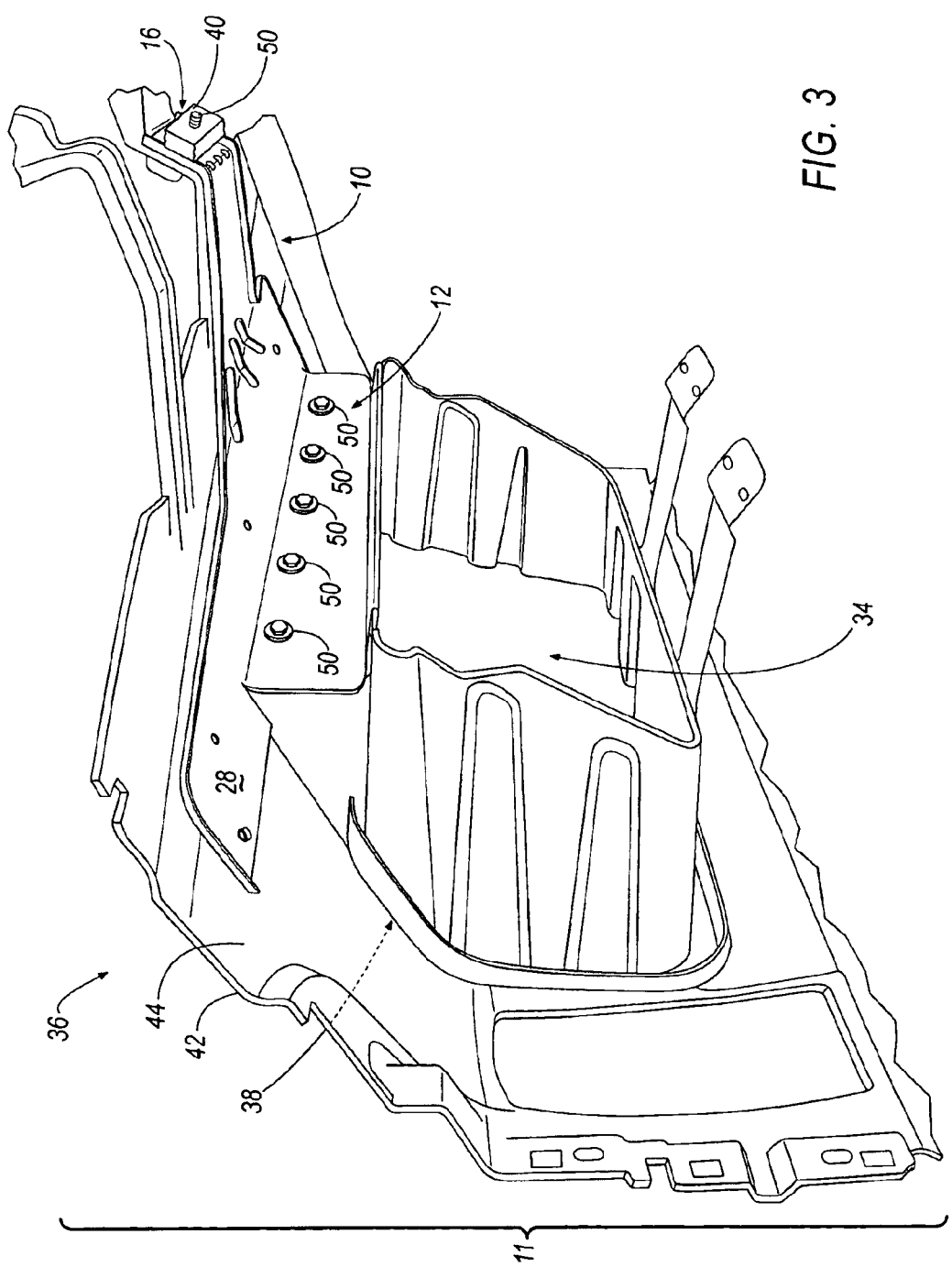
FIG. 3 is a rear, inboard, cutaway perspective view of the inflatable restraint module when the structural reinforcement member is attached to the inflatable restraint module.
Figure 4:
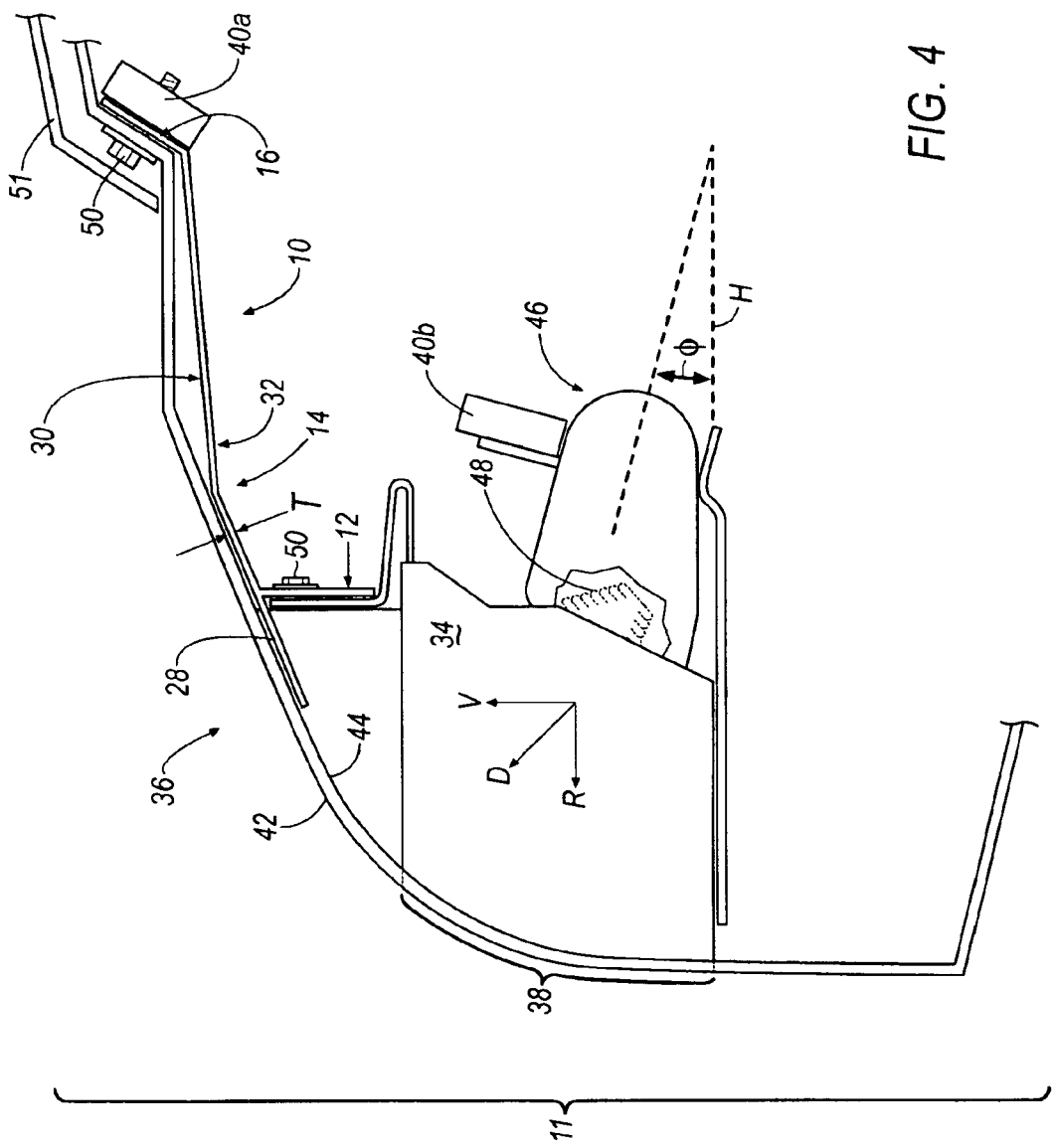
FIG. 4 is a side view of the inflatable restraint module with an inflatable restraint and the structural reinforcement member when attached to the inflatable restraint module.

Referring to FIG. 1, a structural reinforcement member, shown generally at 10, according to an embodiment of the invention, maintains proper deployment of an inflatable restraint about an inflatable restraint module 11 (FIGS. 2–4). The structural reinforcement member 10 may comprise any desirable material, such as steel, that may be stamped or formed using any desirable alternative method. The inventive feature and utility of the structural reinforcement member 10 is described in more detail below. Directions used in the description of the invention such as "rearward" and "vertical" are meant to establish a frame of reference in describing the invention and are not meant to restrict the or limit patentable features of the invention as described in the claims below.

The structural reinforcement member 10 generally comprises a first attachment portion 12 and an intermediate portion 14 that extends from the first attachment portion 12 that is integral with a second attachment portion 16. The first and second attachment portions 12, 16 include five fastener passages 18a–18e and a fastener passage 20, respectively. However, the invention is not limited by the number of fastener passages and the first and second attachment portions 12, 16 may include any desirable amount of fastener passages.

According to the illustrated embodiment, the structural reinforcement member 10 may also include a beveled portion 22 located at a neck 24 of the intermediate portion 14. The purpose of the beveled portion 22 is to promote installation of the structural reinforcement member 10 about the inflatable restraint module 11. However, the beveled portion 22 can be located at any desirable location of the structural reinforcement member 10.

The structural reinforcement member 10 may also include at least one stiffening rib 26 disposed on a surface 28 of the structural reinforcement member 10. According to the illustrated embodiment, three stiffening ribs 26 in a "chicken foot" configuration are located on the surface 28, which is hereinafter referenced as the outboard surface 28 of the first attachment portion 12 and the intermediate portion 14. The stiffening ribs 26 may be offset or centrally located about a central portion of the intermediate portion 14. The stiffening ribs 26 may be in any desirable form and may be of any desirable thickness. For example, the stiffening ribs 26 may be in the form of a groove or slot having a thickness that is greater than, equal to, or less than the thickness, T (FIG. 4), of the structural reinforcement member 10. Alternatively, the stiffening ribs 26 may be solid so as to increase the thickness, T, of the intermediate portion 14 of the structural reinforcement member 10. Although only three stiffening ribs 26 are illustrated on the surface 28 of the first attachment portion 12 and the intermediate portion 14 in a "chicken foot" configuration, any desirable amount or configuration of the stiffening ribs 26 may be disposed on any surface of the structural reinforcement member 10. For example, the stiffening ribs 26 may be located on an inboard surface 30 (FIG. 4) of the structural reinforcement member 10.

The structural reinforcement member 10 may also include any desirable shape having any desirable width, W, length, L, thickness, T, or draft angle, θ. The width, W, length, L, and thickness, T, may be of any desirable dimension to impart greater stiffness about the inflatable restraint module 11. Preferably, the width, W, length, L, and thickness, T, of the structural reinforcement member 10 may be increased in order to provide additional structure where there is an absence of an existing structure about the inflatable restraint module 11, such as a radio mounting structure (not shown). The draft angle, θ, is referenced from a dashed line X, and a throat portion 32 (FIG. 1) of the intermediate portion 14 near the neck 24. The dashed line, X, is generally parallel to the throat portion 32. The draft angle, θ, generally defines the angle at which the intermediate portion 14 extends from the first attachment portion 12 in order to facilitate attachment of the structural reinforcement member 10 to the inflatable restraint module 11.

Referring now to FIGS. 2 and 3, the inflatable restraint module 11 comprises an inflatable restraint chute 34 and an instrument panel or dashboard 36 including an inflatable restraint door 38 (FIG. 4) that is laser etched or otherwise formed in the dashboard 36 by using any means well known in the art. As shown more clearly in FIG. 4, the dashboard 36 is affixed to a structural member 40a, which is commonly referred to in the art as a "cross-car beam" or a "mag-beam" that may be located behind a firewall (not shown). More specifically, the dashboard 36 is indirectly attached to the structural member 40a through the intermediate attachment of the structural reinforcement member 10 at the second attachment portion 16, as described in more detail below.

As seen in FIG. 4, the dashboard 36 may include a soft, aesthetically pleasing skin material 42 that is visible to the occupants of the vehicle, and a rigid substrate 44 formed of any desirable thermoplastic resin, such as, for example, Acrylnitril-Butadien-Styrol-Copolymere (ABS), Polypropylene (PP), Polycarbonate-Acrylnitril-Butadien-Styrol-Copolymere (PC/ABS), Thermoplastic Olefin (TPO), or polyvinyl chloride (PVC). The dashboard may also comprise foam (not shown) between the skin material 42 and the rigid substrate 44.

The inflatable restraint chute 34 may be integral with and extend from the substrate 44. Alternatively, the inflatable restraint chute 34 may be separate from and be attached to the substrate 44 with fasteners or a desirable adhesive. The inflatable restraint module 11 also includes an inflatable restraint canister 46, which may be affixed to a structural member 40b, that contains an inflatable restraint 48, commonly referred to as an airbag. The inflatable restraint canister 46 and dashboard 36 may be directly or indirectly attached to the member 40a, which may be a separate component or the same structural member as the structural member 40b.

Referring back to FIGS. 2 and 3, fasteners 50, such as rivets, bolts, or the like, may pass through the fastener passages 18a–18e and 20 on the attachment portions 12, 16 and substrate fastener passages 52 on a dashboard inboard surface 54 and a chute surface 56, respectively. The fastener 50 that passes through the fastener passage 20 also passes through the structural member 40a, thereby anchoring and providing a hard connection from the substrate 44 and the second attachment portion 16 to the structural member 40a. The fastener 50 that passes through the dashboard 36 at the second attachment portion 16 may be covered with an additional decorative closeout 51, such as, for example, a valance panel. Although a total of six fastener passages 52 are disposed about the dashboard inboard surface 54 and the chute surface 56, respectively, the number of substrate fastener passages 52 depend on the number of fastener passages 18a–18e and 20 formed in the attachment portions 12, 16, respectively. Thus, the invention is not limited by the number of substrate fastener passages 52 included in the design of the structural reinforcement member 10 and inflatable restraint module 11.

Referring now to FIG. 4, the inflatable restraint 48 inflates and deploys through the inflatable restraint door 38 towards an occupant of the vehicle. Upon deployment of the inflatable restraint 48, deployment forces, which are generally indicated by deployment geometry including a rearward vector, R, a vertical vector, V, and a thrust vector, D, occur about the inflatable restraint module 11. The combination of the rearward vector, R, and the vertical vector, V, result in the thrust vector, D, and are each generally directed towards the occupant and the windshield, respectively. The thrust vector, D, may comprise any desirable angle, such as, for example, approximately 20 degrees, which is referenced from the rearward vector, R.

Essentially, the deployment force occurring about the inflatable restraint module 11 when the inflatable restraint deploys imposes stresses on the inflatable restraint module 11, particularly on the substrate 44 and the chute 34, and attempts to cause rearward displacement of the inflatable restraint module 11. Generally, the rearward vector, R, comprises most of the deployment force that attempts to cause rearward displacement of the chute 34 and the dashboard 36. However, most of the deployment force associated with the rearward vector, R, is harnessed by the structural reinforcement member 10 due to the hard attachment of the structural reinforcement member 10 to the structural member 40a, thereby causing the structural reinforcement member 10 to go into tension and relieving the stresses imposed on the substrate 44 and chute 34.

The structural reinforcement member 10 also retains head impact characteristics of the inflatable restraint module 11 under occupant loading of the inflatable restraint 48 such that the dashboard 36 and the structural reinforcement member 10 may bend or flex so that absorption of impact energy transmitted to the inflatable restraint 48 may be expedited about the inflatable restraint module 11 and the structural reinforcement member 10. The thickness, T, of the structural reinforcement member 10 permits the retention of head impact characteristics through the inclusion of the bending and flexing qualities of the structural reinforcement member 10. For example, in the illustrated embodiment, the structural reinforcement member 10 may be made of steel material having a thickness, T, of approximately 1.5 mm.

The structural reinforcement member 10 may be implemented in the inflatable restraint module 11 having impact geometry including an inflatable restraint deployment angle, φ, which is referenced from a horizontal line, H, that is generally parallel from a vehicle floor or base pan (not shown). Accordingly, the structural reinforcement member 10 may be implemented in inflatable restraint modules 11 having inflatable restraint deployment angles, φ, that comprises a deployment force that urges rearward displacement of the chute 34 and dashboard 36 towards the rearward vector, R. The inflatable restraint deployment angle, φ, may comprise any desirable angle, such as, for example, approximately less than or equal to 30 degrees.

Accordingly, the structural reinforcement member 10 provides additional structure to the inflatable restraint module 11 and restricts a deployment force that urges rearward displacement of the chute 34 and dashboard 36 at any distance, such as, for example, a distance approximately equal to 50 mm or more, thereby impeding resulting stresses of the substrate 44 that may otherwise displace or fracture a portion of the inflatable restraint module 11, such as the dashboard 36 and/or chute 34, causing improper deployment of the inflatable restraint 48. Thus, the deployment geometry including vectors, R, V, and D, may be maintained in order to maintain proper alignment and deployment of the inflatable restraint 48.

Even further, in a head impact situation, the structural reinforcement member 10 may flex upon restricting a deployment force that urges rearward displacement of the chute 34 and dashboard 36. Thus, the loading geometry including an inflatable restraint deployment angle, φ, may be maintained, thereby retaining head impact characteristics of the inflatable restraint module 11 under occupant loading of the inflatable restraint 48.

It should be understood that the aforementioned and other various alternatives to the embodiments of the invention described herein may be employed in practicing the invention. It is intended that the following claims define the scope of the invention and that the method and apparatus within the scope of these claims and their equivalents be covered thereby.

What is claimed is:

1. A structural reinforcement member for an inflatable restraint chute extending from an instrument panel and having an inflatable restraint disposed therein, said structural reinforcement member comprising a first attachment portion directly attached to the inflatable restraint chute and a second attachment portion directly attached to a cross-car beam, wherein the inflatable restraint exerts a deployment force about the inflatable restraint chute upon deployment, and wherein the structural reinforcement member transfers a portion of the deployment force exerted by the inflatable restraint to the cross-car beam.

2. The structural reinforcement member according to claim 1, wherein the deployment force comprises a rearward vector, a vertical vector, and a thrust vector comprising a combination of the rearward vector and the vertical vector.

3. The structural reinforcement member according to claim 2, wherein the thrust vector is exerted at an angle of approximately twenty (20) degrees with respect to the rearward vector.

4. The structural reinforcement member according to claim 2, wherein the rearward vector comprises a substantial portion of the deployment force exerted by the inflatable restraint.

5. The structural reinforcement member according to claim 1, wherein the inflatable restraint deploys at an inflatable restraint deployment angle of approximately less than or equal to thirty (30) degrees.

6. The structural reinforcement member according to claim 1, wherein the structural reinforcement member has a thickness of approximately 1.5 mm that allows the structural reinforcement member to bend or flex during transfer of the deployment force.

7. An inflatable restraint module, comprising:

an instrument panel, an inflatable restraint chute extending from the instrument panel and including an inflatable restraint disposed therein; and a structural reinforcement member having a first end directly attached to the inflatable restraint chute and a second end directly attached to a cross-car beam, wherein the inflatable restraint exerts a deployment force about the inflatable restraint module upon deployment, and wherein the structural reinforcement member transfers a portion of the deployment forces to the cross-car beam.

8. The inflatable restraint module according to claim 7, wherein the deployment force comprises a rearward vector, a vertical vector and a thrust vector, and wherein the thrust vector comprises a combination of the rearward vector and the vertical vector.

9. The inflatable restraint module according to claim 8, wherein the thrust vector is at an angle of approximately twenty (20) degrees with respect to the rearward vector.

10. The inflatable restraint module according to claim 8, wherein the rearward vector comprises a greater portion of the deployment force than the vertical vector.

11. The inflatable restraint module according to claim 7, wherein the structural reinforcement member has a thickness of approximately 1.5 mm that allows the structural reinforcement member to bend or flex during transfer of the deployment force.

12. The inflatable restraint module according to claim 7, wherein the inflatable restraint deploys at an inflatable restraint deployment angle of approximately less than or equal to thirty (30) degrees.

13. A structural reinforcement member for an inflatable restraint chute extending from an instrument panel and having an inflatable restraint disposed therein, said structural reinforcement member comprising a first attachment portion directly attached to the inflatable restraint chute and a second attachment portion directly attached to a cross-car beam, wherein the inflatable restraint exerts a deployment force having a deployment geometry, and wherein the structural reinforcement member transfers a portion of the deployment force to the cross-car beam, thereby maintaining a proper alignment of the inflatable restraint chute during deployment of the inflatable restraint.

14. The structural reinforcement member according to claim 13, wherein said structural reinforcement member controls an amount of rearward displacement of the inflatable restraint chute to maintain proper alignment of the inflatable restraint chute during deployment of the inflatable restraint.

15. The structural reinforcement member according to claim 13, wherein the deployment geometry comprises a rearward vector, a vertical vector, and a thrust vector comprising a combination of the rearward vector and the vertical vector.

16. The structural reinforcement member according to claim 15, wherein the thrust vector is at an angle of approximately twenty (20) degrees with respect to the rearward vector.

17. The structural reinforcement member according to claim 15, wherein the rearward vector comprises a greater portion of the deployment force than the vertical vector.

18. The structural reinforcement member according to claim 13, wherein the structural reinforcement member has a thickness that allows the structural reinforcement member to bend or flex during transfer of the deployment force.

* * * * *